358-140. OR 3,806,644 SR

United States Patent [19]
Browne et al.

[11] 3,806,644

[45] Apr. 23, 1974

[54] VIDEO FORMAT CONVERTER

[75] Inventors: Paul Nolan Browne, Shrewsbury, N.J.; Harry Shaner Burns, Everett, Wash.; Thomas Joseph Kelley; Helmuth Otto Sautter, both of Middletown, N.J.

[73] Assignee: Bell Telephone Laboratories, Incorporated, Murray Hill, N.J.

[22] Filed: Feb. 23, 1973

[21] Appl. No.: 335,257

[52] U.S. Cl. ......... 178/6.8, 178/DIG. 24, 179/2 TV

[51] Int. Cl. .......................... H04n 5/46, H04n 7/18

[58] Field of Search ......... 178/6.8, DIG. 3, DIG. 24; 179/15.55 T, 2 TV

[56] References Cited

UNITED STATES PATENTS 3,436,474 4/1969 Saeger ................................ 178/7.1

3,621,150 11/1971 Pappas ........................ 179/15.55 T

*Primary Examiner*—Howard W. Britton

*Attorney, Agent, or Firm*—C. E. Graves

[57] ABSTRACT

Signals having the format standards of the PICTUREPHONE video telephone (PVT) system are converted to a signal having the format standards of commercial television (CTV). Achieving the foregoing is a scan converter which includes two shift registers in which successive lines are alternately stored at the line rate of the PVT system. As one register is filled, samples from the preceding PVT line are read out at a substantially faster rate. The registers are then switched as to function. A signal format is generated to cause the CTV receiver to operate in a noninterlace mode to produce a resulting CTV line raster that is in effect exactly equal to the number of lines in a PVT frame.

10 Claims, 6 Drawing Figures

T5055

VIDEO FORMAT CONVERTER

FIELD OF THE INVENTION

This invention relates to video systems and in particular involves a scan conversion process and apparatus.

BACKGROUND OF THE INVENTION

The commercial television picture scannning standards prevailing in the United States and elsewhere differ from those established for the Bell System PICTUREPHONE video telephone network in the United States. A comparison of the two standards is best afforded by reference to Table I and II below.

TABLE I

| | PICTUREPHONE Video Telephone Signal Standard |
|---|---|
| Scan lines per frame | 267 |
| Field rate | 59.93 Hz |
| Fields per frame | 2: Fields A and B (2:1 interlaced) |
| Line scan rate | 8.0 kHz |
| Aspect ratio | 11/10 |
| Video bandwidth | 1 MHz |

TABLE II

| | Commercial Television Signal Standard |
|---|---|
| Scan lines per frame | 525 |
| Field rate | 59.94 Hz |
| Fields per frame | 2: Fields A and B (2:1 interlaced) |
| Line scan rate | 15.734 kHz |
| Aspect ratio | 4/3 |
| Video bandwidth | 4.5 MHz |

The technical reasons which governed selection of the PICTUREPHONE standards are documented in the *Bell System Technical Journal*, Volume 50, Number 2, at pages 235–269. The entire cited issue of this issue of the Journal is devoted to the PICTUREPHONE system, and is hereby incorporated by reference into this patent application.

The incompatibility of the two systems can be overcome by a scan converter that accepts PICTUREPHONE video telephone format signals as input and produces commercial television-compatible signals as output. Converters offered to date, however, have been complex and costly. As a result, the prospects for interfacing of these two important communications systems have been uncertain.

Accordingly, the following are objects of the invention:

- to convert in near real-time a signal having the format standards of PICTUREPHONE video telephony to a signal having the format standards of commercial television, and vice-versa;
- to render the differing line scan rates used in the commercial TV raster compatible with PICTUREPHONE line scan rates, and vice-versa;
- to achieve the foregoing objects without sacrificing PICTUREPHONE 2:1 interlace; and
- to achieve all of the foregoing objects inexpensively.

SUMMARY OF THE INVENTION

The invention is one major aspect lies in the recognition that the horizontal scan rates of PICTUREPHONE video telephony (hereinafter called PVT) and commercial television (hereinafter called CTV) differ by a factor close to 2; and the number of lines per PVT frame are very nearly equal to the number of lines per CTV field.

Proceeding from this realization, the scan converter of the present invention consists of two shift registers in which successive lines of PVT are alternately stored, first for field A and then for field B. The PVT line is sampled at a rate of 2.0 MHz, for example. While one register is being filled with samples from a given line, the samples from the preceding line are read out of the other register at, for example, a 5.0 MHz rate. The two registers are then switched as to function. As the successive PFT fields A and B are received, the lines of each are continuously so processed.

Pursuant to the invention, the CTV receiver is caused to operate in a noninterlaced mode by virtue of the video synchronizing format presented to it. Pursuant to this aspect of the invention, the local horizontal oscillator of the CTV is forced to operate at a rate that will generate 534 scan lines per frame, instead of the standard 525 lines. The 534 lines correspond to a line scan rate of 16.0 kHZ rather than the standard 15.734 kHz. Because the 534 lines per frame are an even number, the two fields A and B which comprise the CTV frame will be projected not as interlaced fields, but actually atop one another. The resulting line raster is thus in effect one-half of the 534 lines, or 267 lines. It is seen that this number exactly equals the number of lines in a PVT frame.

Put in other words, the 267 lines that make up CTV field A may be considered to be the odd lines of a 534 line frame if interlace were occurring; and the 267 lines of CTV field B would be the even lines. With superposition of field B lines atop the field A lines, the "frame" consists of just 267 lines. The 133½ odd-numbered lines of this "frame" will receive the 133½ lines of PVT field A; and the 133½ even-numbered lines will receive the 133½ lines of PVT field B. The alternate lines not receiving PVT information may be blanked.

In the inventive process, once a register contains a complete line in storage, clock pulses are initiated to cause that register to read out at the 5.0 MHz rate. Thus, the first line of PVT field A is forwarded to the CTV and displayed on the first line of the 267-line field A raster. The next line, line 2, of field A of the CTV raster is in one case blanked. Each successive line of PVT field A is stored and then read out in sequence into the odd-numbered lines of the CTV 267 line raster while the even-number lines are blanked. When all 133½ lines of the PVT field A are thus processed, the line information from PVT field B is received, stored and read out in the same fashion by the two shift registers. Now, however, the even-numbered lines of the PVT frame, namely the lines which make up frame B, are read out in sequence into the even-numbered lines of the 267-line CTV raster.

Thus, two successive fields of the modified CTV raster display show the information from PVT frames A and B displaced by one line. This is, of course, the equivalent of the 2:1 interlaced raster of the standard PVT frame.

In a preferred embodiment, the shift registers of the scan converter are constructed of charge-coupled devices which have the inherent capability of analog sample storage that make them uniquely suitable in the practice of the invention.

Pursuant to another aspect of the invention, the output video of the scan converter is further adjsuted by proper shift rate selection and selective blanking so as to create on the TV display an image having the PICTUREPHONE aspect ratio of 11:10 rather than the aspect ratio 4:3 characteristic of CTV sets.

The output video of the converter may be fed either to the TV receiver set video amplifier directly, or—in an embodiment simpler from the user's standpoint—to the receiver set's antenna input terminal. The latter arrangement requires the generation of a modulated *r-f* video signal within the converter with a carrier whose frequency is advantageously adjusted to an idle receiver set channel.

The invention and its further objects, features, and advantages will be readily understood in its breadth as well as detail from a reading of the description to follow of an illustrative embodiment.

THE DRAWING

DETAILED DESCRIPTION OF AN ILLUSTRATIVE EMBODIMENT

The first illustrative embodiment is one in which a PVT signal format is converted for display on a CVT monitor or receiver.

The steps to realize conversion of the PVT signal to CTV compatible format are: (a) analog processing of the received PVT; (b) successive sampling and shift register storage of the two PVT fields A and B for each PVT frame; (c) logical control of phasing and clocking for shift register operation and CTV line rate control; and (d) if necessary, modulation of the resulting TV format to an available channel for display on commercial receivers.

Figure 1:
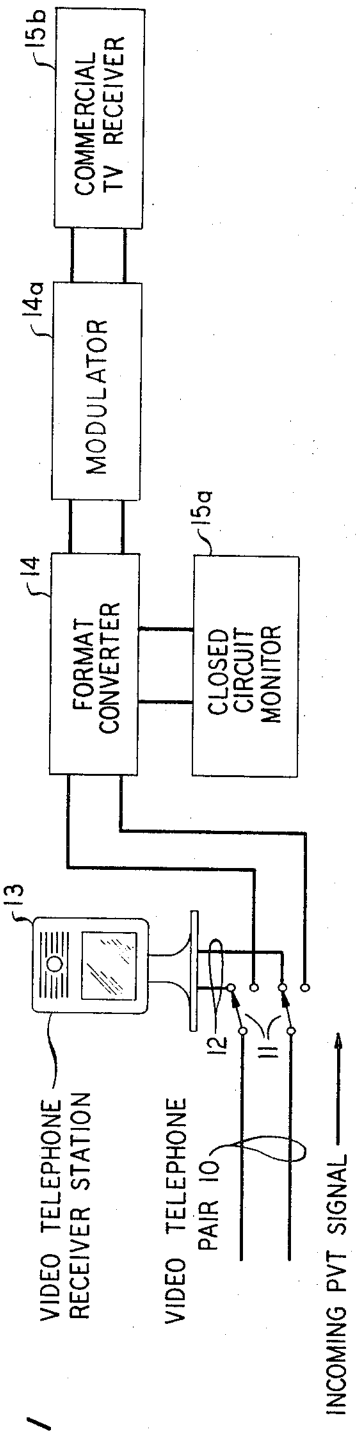
FIG. 1 is a schematic block diagram showing the format converter of the present invention connecting a video telephone system to a closed circuit monitor or a commercial TV receiver.
Figure 2:
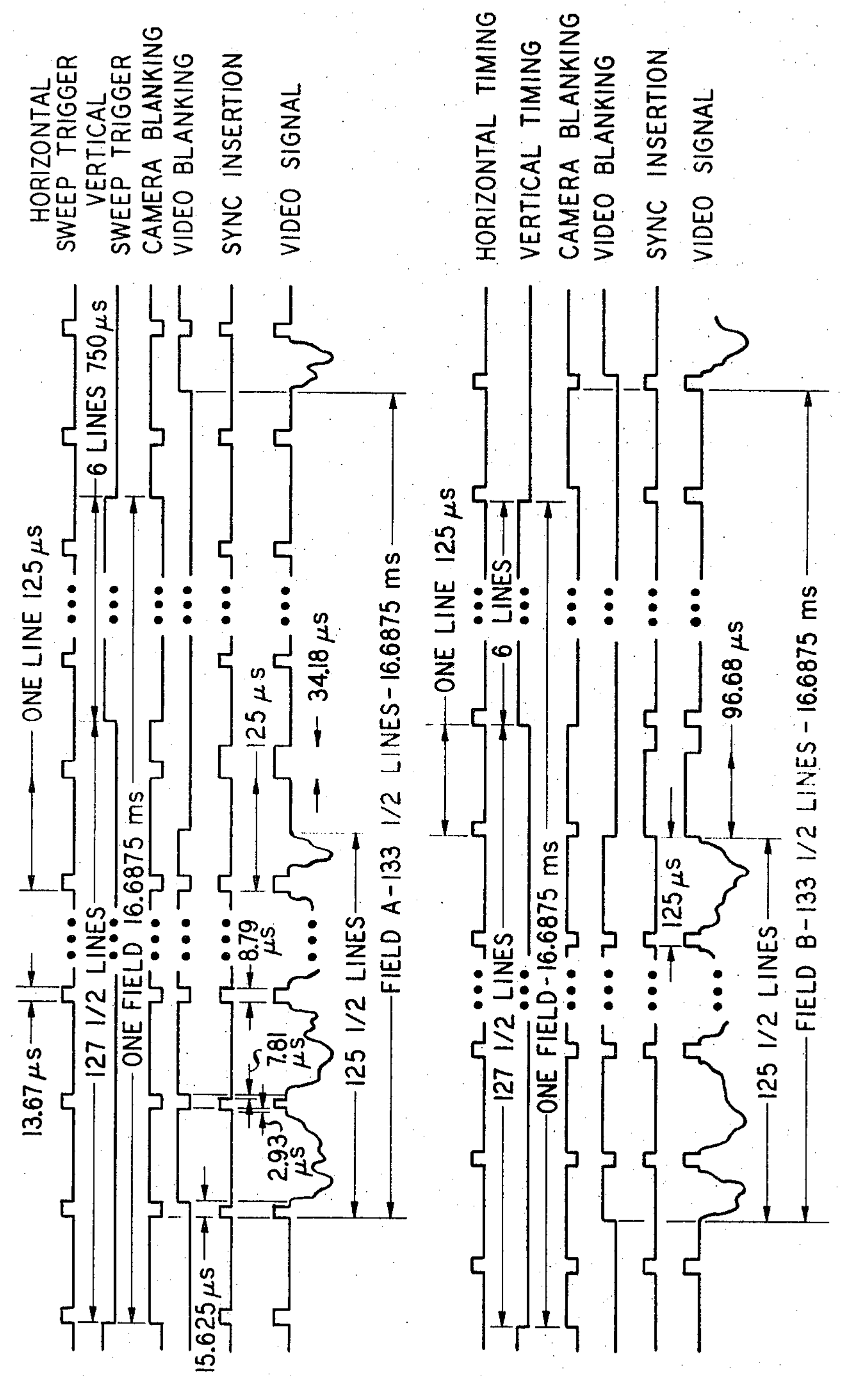
FIG. 2 is a timing pulse diagram.

FIG. 1 shows a video telephone pair 10 which contains a PVT signal with the format shown in Table I. A switch 11 may be supplied to direct the incoming signal via pair 12 to a PVT receiver station 13; and/or to a format converter 14. The latter generates a baseband CTV format signal in a manner to be described, that may be coupled directly to a closed cicuit monitor 15*a*, or via a modulator 14*a* to a CTV set 15*b*. In considering the function of the format converter 14 shortly to be described, it will be desirable to occasionally refer to FIG. 2 which depicts the standard timing signals for PVT.

Figure 3:
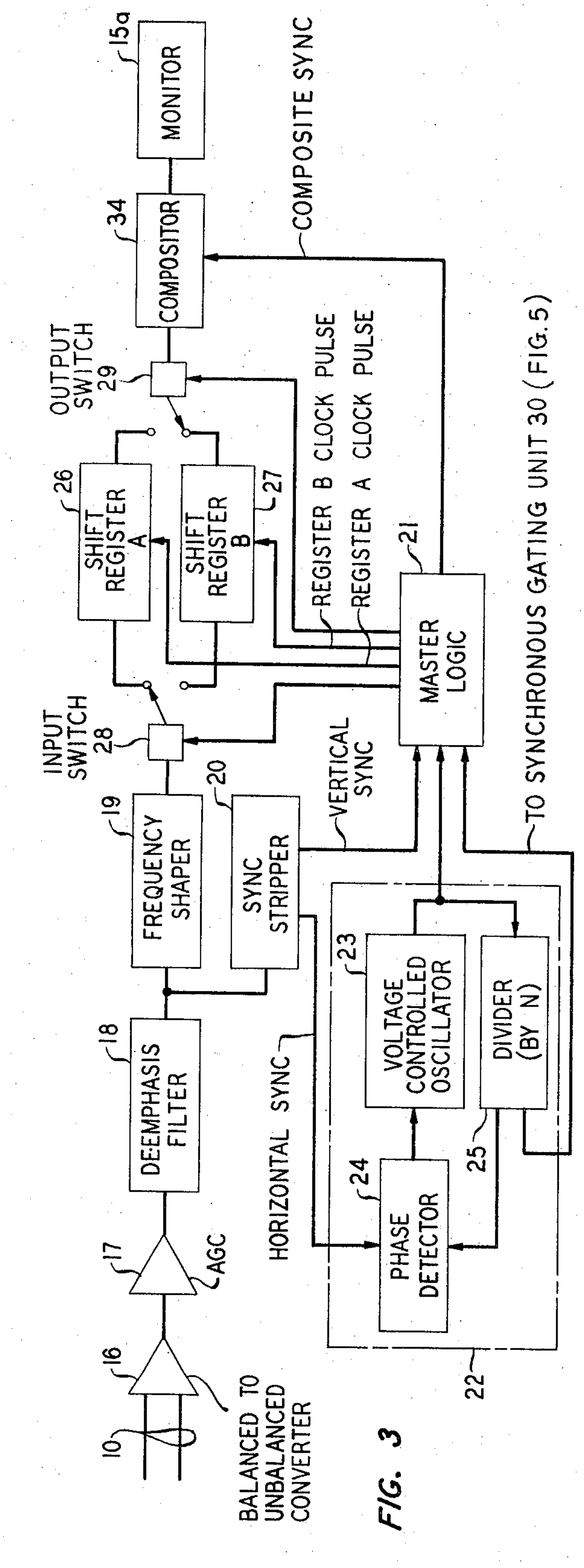
FIG. 3 is a schematic block diagram of the format converter.
Figure 4:
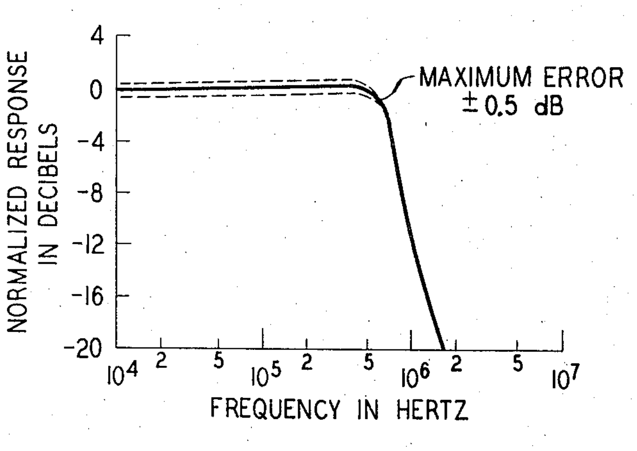
FIG. 4 is a graph showing a mormalization function.

As seen in FIG. 3, analog processing involves the feeding of incoming signal via pair 10 to the balanced to unbalanced converter 16, automatic gain amplifier 17, and PVT deemphasis filter 18. Further description of elements 16–18 may be found in the abovecited BSTJ issue at pages 289–292. The output of filter 18 is a video signal that is single-ended and dc restored. The output of filter 18 is connected to frequency shaper 19 which may, for example, have the frequency response characteristic shown in FIG. 4. Also, the output of filter 18 is supplied to sync stripper 20 which recovers the horizontal and vertical sync signals.

Sampling and storage of the frequency-shaped video signal is under the control of the master logic unit 21 which receives as inputs the vertical sync signal and the output of a phase-locked loop 22. The latter generates the timing pulses for synchronous sampling, by generating high-frequency shift signals that are exact multiples of the PVT horizontal frequency. Loop 22 consists of a voltage-controlled oscillator (VCO) 23 which is in effect an output clock. The horizontal sync pulse from stripper 20 is fed to phase detector 24. The output of phase detector 24 controls the VCO 23. A feedback loop between VCO 23 and detector 24 includes a divider 25.

In the sampling process shortly to be described, resolution will be maintained if the 1 MHz PVT signal from shaper 19 is sampled at a rate $f_s = 2$ MHz. This sampling rate then determines the number of storage elements required in the two storage registers 26 and 27. As will be demonstrated shortly, this number, *n*, will advantageously be equal to 210 samples per line for the approximately 105-microsecond PVT line.

The rate, designated $f_o$ at which the 210 samples are read from storage in registers 26 and 27, is determined by a consideration of the 4:3 commercial TV aspect ratio and the 11:10 PVT aspect ratio, as well as the active line scan times of the PVT and CTV systems. From this it follows that the ratio $f_o/f_s = 2.5$, provides very nearly the proper 11:10 aspect ratio for display of PVT format on commercial TV receiver sets.

At page 469 in the earlier-cited BSTJ issue, it is pointed out that it is desirable to synchronously sample a PVT video signal in order to minimize "edge busyness". The term synchronous sampling here means that the samples are taken from the same places in time, from line to line and from frame to frame. To achieve such synchronous sampling, $f_s$ and $f_o$ should be locked to the horizontal PVT line rate. The latter is achieved in the phase-locked loop 22 by setting VCO 23 at a frequency $f_{VCO} = 5 \times f_s$; and then in master logic unit 21, obtaining $f_o$ and $f_s$ by frequency division of 2 and 5 respectively in dividers 32 and 31.

The horizontal sync signal arrives at phase detector 24 at an 8 kHz rate where it is compared with an 8 kHz signal counted down from the VCO 23. A locked 16 kHz output obtained from divider 25 is required to supply CTV video format. It can be seen that $$f_{VCO}/8 \text{ kHz} = \text{integer } (n) \tag{1}$$

It may be shown that the number by which divider 25 divides the VCO 23 output signal in the feedback loop is equal to or less than 1250. If *n* equals 1250, then the following obtains:

$f_{VCO} = 10$ MHz
$f_s = 2$ MHz
$f_o = 5$ MHz

From the foregoing it follows that the number of storage elements required is about 210 elements.

Alternatively, the clock frequencies $f_s$ and $f_o$ may be derived in a manner different from the phase locked loop 22 used in the illustration. A second scheme may be used in which phase locked loop 22 is replaced by two free-running clocks operating at nominally 2 MHz and 5 MHz. These clocks are "reset" once per horizontal line for input and output clocking respectively. Synchronization is accomplished only once per horizontal line. This free-running cloking means, while not as precise as the previous example, is accomplished with far fewer components.

Figure 5:
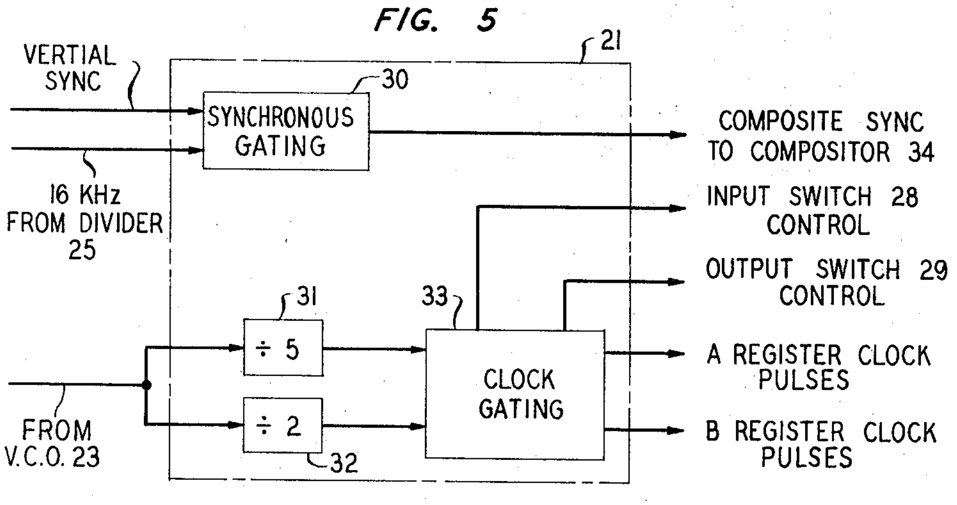
FIG. 5 is a schematic block diagram of the logic unit.
Figure 6:
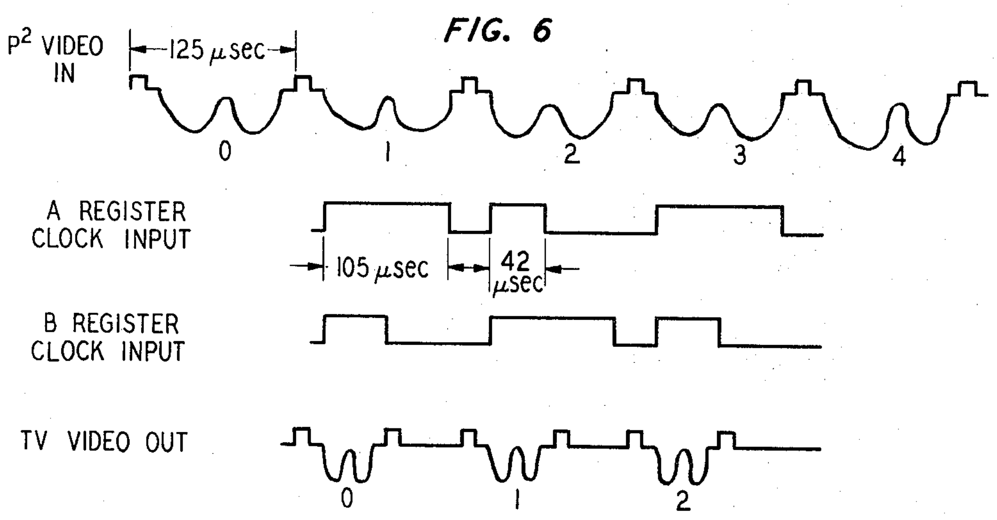
FIG. 6 is a second timing pulse diagram.

Shift registers 26 and 27 are under control of master logic unit 21 which is depicted in FIGS. 5 and 6. As seen in FIG. 5, the logic unit 21 consists of synchronous gate 30 to which the vertical sync signal from stripper 20 is supplied, along with the 16 kHz from loop 22. The output of gate 30 is a composite sync signal that is directed to video compositor 34 where it is composited with the video output from 29 in conventional fashion. The composite sync signal is of a form described on page 68, *Basic Television*, by Bernard Brob, 1954, with the horizontal output rate equal in this case to twice the incoming PVT rate.

The frequencies $f_s$ and $f_o$ are directed to clock gating unit 33, where timing pulses denoted "register A clock" and "register B clock" are generated. A full description of the timing and duration of these pulses will be aided by reference to FIG. 6. As shown, each line of the input PVT signal is sampled by register A or B alternately. The register not being filled is read out at CTV rate as shown in the bottom line of FIG. 6.

The master logic unit also generates control signals for controlling input switch 28 to direct the successive incoming PVT lines alternately to registers 26 and 27 and for controlling output switch 29 for alternately connecting registers 26 and 27 to a monitor such as monitor 15*a*. The timing of the control signals for switches 28 and 29 are also depicted in FIG. 6.

The invention has so far been described in terms of analog storage in registers 26 and 27. For this purpose, so-called charge-coupled devices are well suited as the shift register store because of their analog storage ability, ease of clocking, small size, and ultimate lower cost. Charge-transfer devices of which charge-coupled devices and so-called bucket brigade devices are species, are fully described in *The Bell System Technical Journal*, Vol. 51, No. 3, March 1972, pages 655-703, which is hereby incorporated by reference.

Of course, digital storage is also possible using, for example, an A-to-D converter, a digital storage register and a D-to-A converter to emulate the function of a purely analog register (none shown).

The spirit of the invention is embraced in the scope of the claims to follow.

What is claimed is:

1. Apparatus for converting a first video signal having a format of the standard specified in TAble I of this specification to a second video signal having a format acceptable by a video receiver designed to receive a signal of the standard specified in TAble II of this specification, comprising:

means for receiving said first video signal and for recovering horizontal and vertical sync pulses therefrom;

first and second shift registers;

means for storing, at an 8 kHz line rate, successive whole lines of said first video signal alternately in said first and second registers;

means for reading out, at a 16 kHz line rate, an entire said stored line at a time, from either said register while the other said register is being filled with the next successive said line;

means synchronized with said reading out means for applying each said stored line to said video receiver alternately from said registers; and means for causing said video receiver to operate in a noninterlace mode.

2. Apparatus pursuant to claim 1, wherein said causing means comprises means for generating sync pulses to cause the local horizontal oscillator of said video receiver to operate at a rate that produces 534 scan lines per frame.

3. Apparatus pursuant to claim 1, further comprising: means for generating timing pulses for synchronously sampling the 1 MHz first video signal at a sample rate $f_s$ of substantially 2 MHz, said timing pulses being substantially exact multiples of said recovered horizontal sync pulses.

4. Apparatus pursuant to claim 3, wherein said means for generating timing pulses comprises a phase-locked loop comprising:

phase detector means for receiving said recovered horizontal sync pulses, oscillator means operating at a frequency of substantially five times said sample rate $f_s$, and a feedback loop connecting said oscillator means and said detector means, and including frequency divider means.

5. Apparatus pursuant to claim 4, wherein said first and second shift registers comprise means for storing said samples of said first video signal, and wherein said readout means reads said stored samples out at a rate $f_o$; and means including said timing pulses produced by said phase-locked loop for substantially locking said rate $f_s$ and said rate $f_o$ to the horizontal line rate of said first video signal.

6. Apparatus pursuant to claim 5, wherein said detector comprises means for comparing said horizontal sync signal with an 8 kHz signal derived from said oscillator means, thereby to produce a first control signal, and means for receiving from said divider means a 16 kHz signal; and wherein said oscillator means comprises means for conbining said first control signal and said 16 kHz signal to continuously adjust the frequency of said oscillator means thereby to lock said rates $f_s$ and $f_o$ to said horizontal line rate of said first video signal.

7. Apparatus pursuant to claim 6, wherein the number of storage elements in each of said storage registers is 210, and wherein the rate $f_o$ at which said 210 samples are read from storage in said registers is such that the ratio $f_o/f_s = 2.5$ is maintained, whereby an aspect ratio of substantially 11:10 is achieved for display of said first video signal on said video receiver.

8. Apparatus pursuant to claim 6, wherein said first and second shift registers comprise charge-coupled devices.

9. Apparatus pursuant to claim 6, wherein said reading-out means further comprises: logic unit means having as inputs said first video signal vertical sync pulse and the output of said oscillator means, said logic unit means comprising means for frequency dividing said oscillator means output by 5 and means for frequency dividing said oscillator means output by 2, thereby to produce distinct signals having the frequencies $f_s$ and $f_o$.

10. Apparatus pursuant to claim 9, wherein said logic unit means further comprises: synchronous gate means for combining said vertical sync pulse from said first video signal and said 16 kHz signal from said phase-locked loop to form a composite sync signal; and means including said composite sync signal for alternately leading out said first and second registers.

* * * * *

UNITED STATES PATENT OFFICE
CERTIFICATE OF CORRECTION

Patent No. 3,806,644 Dated Apr. 23, 1974

Inventor(s) P.N.Browne-H.S.Burns-T.J.Kelly-H.O.Sautter

It is certified that error appears in the above-identified patent and that said Letters Patent are hereby corrected as shown below:

Item [75] Inventors:, 3rd line, "Kelley" should be -- Kelly --.

--. Column 2, line 9, "A" should be -- A --. Column 2, line 9, "B" should be -- B --. Column 2, between lines 26 and 27 "A and B" should be -- A and B --. Column 2, line 36, "B" should be -- B --. Column 2, line 37, "B" should be -- B --. Column 2, line 37, "A" should be -- A --. Column 2, line 40, "A" should be -- A --. Column 2, line 41, "B" should be -- B --. Column 2, line 46, "A" should be -- A --. Column 2, line 48, "A" each occurrence should read -- A --. Column 2, line 50, "A" should read -- A --. Column 2, line 53, "A" should read -- A --. Column 2, line 54, "B" should read -- B --. Column 2, between lines 57 and 58, "B" should read -- B --. Column 2, between lines 61 and 62, "A" should read -- A --. Column 2, between lines 62 and 63, "B" should read -- B --. Column 3, line 4, "adjsuted" should be -- adjusted --.

Signed and sealed this 15th day of October 1974.

(SEAL)
Attest:

McCOY M. GIBSON JR.
Attesting Officer

C. MARSHALL DANN
Commissioner of Patents